United States Patent [19]

Shida

[11] 4,205,262

[45] May 27, 1980

[54] ELECTRONIC WATCH

[75] Inventor: Masaharu Shida, Tokyo, Japan

[73] Assignee: Kabushiki Kaisha Daini Seikosha, Japan

[21] Appl. No.: 858,440

[22] Filed: Dec. 7, 1977

[30] Foreign Application Priority Data

Dec. 7, 1976 [JP] Japan ................................ 51-146939

[51] Int. Cl.[2] ................................................ H02P 1/22

[52] U.S. Cl. ..................................... 318/696; 368/162

[58] Field of Search ............... 318/696, 138, 287, 291, 318/293; 58/23 D; 310/49 R, 40 MM

[56] References Cited

U.S. PATENT DOCUMENTS

| | | | |
|---|---|---|---|
| 4,048,548 | 9/1977 | Nakajima et al. | 318/696 X |
| 4,055,785 | 10/1977 | Nakajima et al. | 318/696 X |
| 4,066,947 | 1/1978 | Nakajima et al. | 318/696 |

*Primary Examiner*—Gene Z. Rubinson
*Attorney, Agent, or Firm*—Robert E. Burns; Emmanuel J. Lobato; Bruce L. Adams

[57] ABSTRACT

An electronic watch comprising a rotor magnetically connected to more than two poles, a stator composed of material of high magnetic transmission factor magnetically engaging with the rotor, means composed of coil magnetically connected to the stator and for positioning the rotor in advance in order to determine a rotating direction of the rotor and means a step motor driven by an alternating pulses, wherein a position of the rotor is brought back to a former magnetically horizontal position from an original position thereof by applying a reverse polarity pulse to the coil just before a normal pulse, and then the rotor is rotated in reverse by the normal pulse whereby a needle may be reversed.

7 Claims, 9 Drawing Figures

ELECTRONIC WATCH

BACKGROUND OF THE INVENTION

The present invention relates to a method for reversing an electronic watch of the type using a step motor.

Conventionally, as shown in FIG. 1 (*a*), a rotor 1 composed of a permanent magnet is rotated by impressing a pulse voltage of period T shown in FIG. 1 (*b*) on a coil 2 of a step motor for rotating the rotor 1. The step motor has a magnetic or mechanical index mechanism in order to keep the direction of rotation of the rotor fixed and therefore, it has been difficult to change the direction of rotation of the rotor in a step motor having an index mechanism.

However, in case of carrying out the amendment or correction of time or that of difference in time, a reversible step motor is extremely effective and gives a great convenience to the user of an electronic watch which includes a reversible step motor.

SUMMARY OF THE INVENTION

The present invention enables the above-mentioned step motor which rotates only in one direction to be reversed by applying a pulse of a polarity opposed to that of a normal driving pulse immediately before the normal driving pulse. Accordingly, the present invention provides a reversible electronic watch.

The present invention will be explained in more detail in conjunction with the accompanying drawings.

DESCRIPTION OF THE PREFERRED EMBODIMENT

Figure 1A:
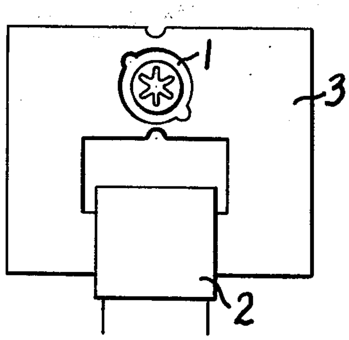
FIG. 1a (PRIOR ART)
FIGS. 1 (*a*) and (*b*) respectively show a conventional step motor and a waveform of a driving pulse thereof.
Figure 2:
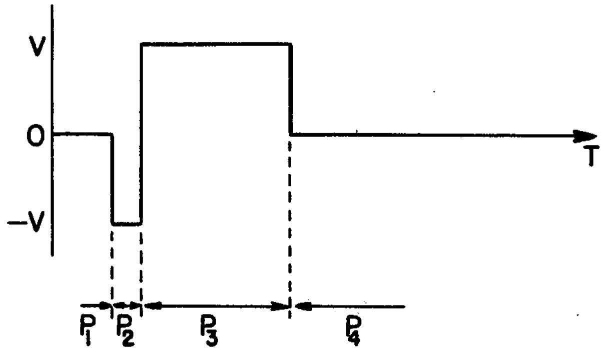
FIG. 2 shows a waveform of a driving pulse.
Figure 1B:
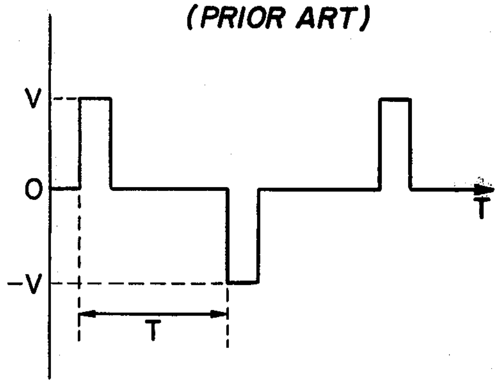
FIG. 1b (PRIOR ART)
Figure 3A:
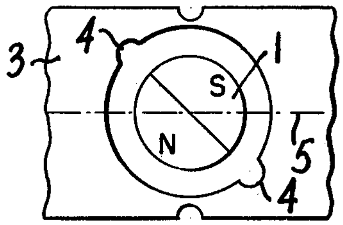
FIGS. 3*a*, 3*b*, 3*c* and 3*d* show a sequence of rotor positions for illustrating rotor reversal in a step motor, effective for reversing a step motor.
Figure 3B:
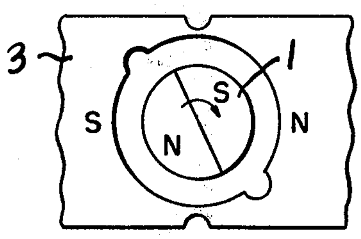
Figure 3C:
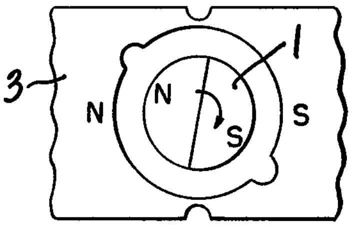
Figure 3D:
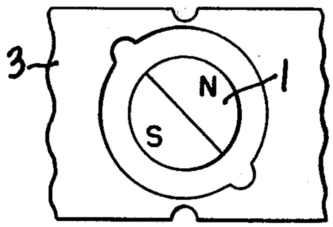

FIG. 2 shows an example of driving pulse waveforms. A pulse P2 is a reverse polarity pulse applied immediately before a normal driving pulse P3 of a step motor.

The relation between a rotor 1 and a stator 3 for a time when a pulse P1 of zero amplitude is applied to the step motor is shown in FIG. 3 (*a*). This is the rest position of the rotor 1.

In this embodiment, a notch 4 is located at a part of a surface of the stator 3 confronting the rotor 1. The rotor 1 has two magnetic poles. The direction of a magnetic pole makes an angle of about 45° with respect to an axis 5 of the stator 3 while the rotor stands still. Applying a pulse P2 to the stator coil causes a magnetic pole pair to be formed in the stator as illustrated in FIG. 3 (*b*).

This magnetic pair rotates the rotor 1 from a resting position thereof in the direction shown by an arrow. Next, when the direction of the magnetic pole of the rotor 1 coincides with the axis of the stator 5, the pulse P2 is changed to the pulse P3. At this time, the rotor is situated at a position shown in FIG. 3 (*c*) and keeps rotating in the direction determined by the pulse P2 due to inertia. A pulse P3 forms a pair of magnetic poles as shown in FIG. 3 (*c*) in the stator and accelerates the rotation of said rotor towards the direction illustrated by an arrow. After the application of the pulse P3 is terminated, the rotor 1 at P4 rests at a position shown in FIG. 3 (*d*) rotated 180° from the position shown in FIG. 3 (*a*). It is easily understood that by applying a pulse having a waveform of opposite polarity then that shown in FIG. 2, the rotor will rotate 180° in the same direction as mentioned above in the process similar to the above-mentioned and back to the rest position shown in FIG. 3 (*a*).

The direction of rotation of the rotor is shown in FIG. 3 (*b*) and opposite to that when the normal driving pulse, which has no pulse P2 in FIG. 2, is applied. Since a S pole is formal at a right side of the stator and a N pole at a left side thereof when normal driving pulses are applied to the motor, the rotor is normally rotated counterclockwise. Thus, the direction of rotation of the rotor is reversed when the step motor is driven in accordance with the present invention.

A most important point in the above-mentioned reversing process is the timing when the pulse waveform shown in FIG. 2 is changed from P2 to P3. Ideally, the time when the direction of the magnetic pole coincides with the axis of the stator is the most significant.

Generally, when a load condition of the rotor is fixed to some degree, it is fully possible to fix the pulse length of P2.

When more stable reverse rotation is expected or required, it is desirable that the position of the rotor be detected and that the pulse length of P2 be made variable so as to terminate P2 when the rotor magnetic pole direction is aligned with the stator axis.

Figure 4:
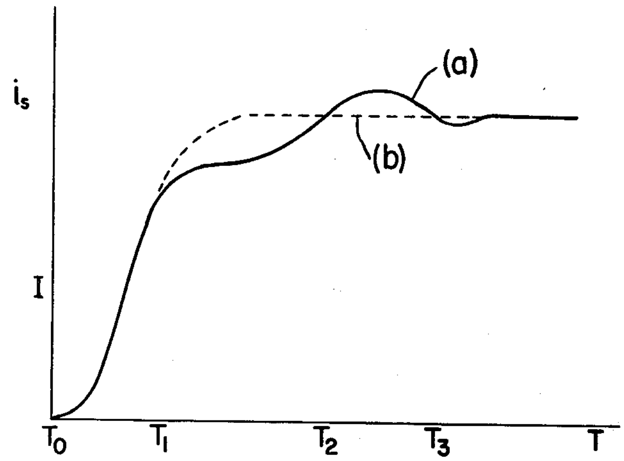
FIG. 4 shows an example of a waveform of a coil current.
Figure 5:
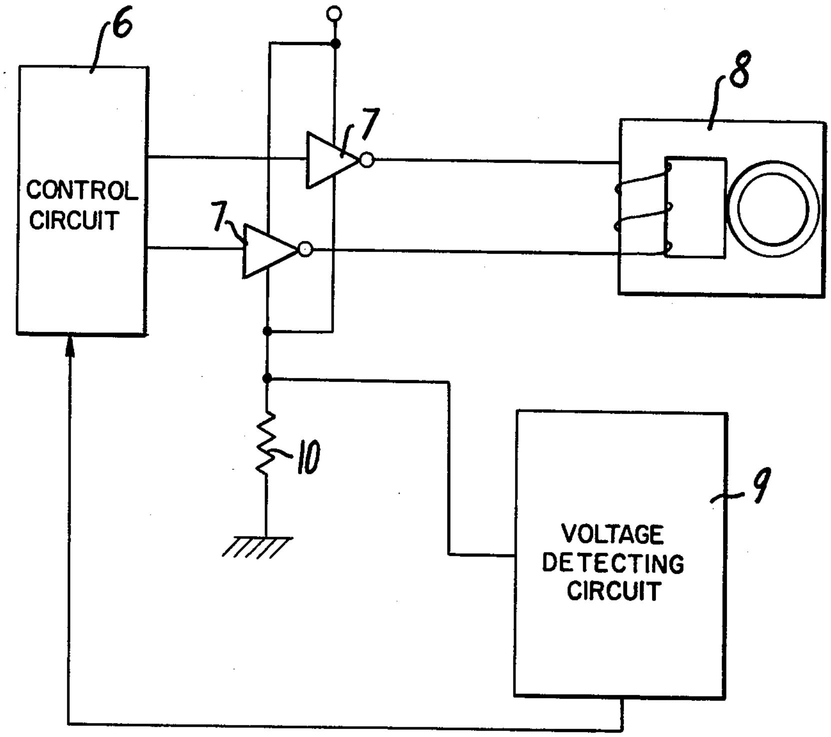
FIG. 5 is an example of a reversible driving circuit provided with a circuit for detecting a position of a rotor in a step motor.

Referring to FIGS. 4 and 5, an embodiment of a circuit for detecting a position of the rotor will be explained hereinbelow. In FIG. 4, a graph (a) shown by a solid line shows a waveform of a step motor coil current in the case that a driving pulse effective to reverse the direction of rotation of the rotor as shown in FIG. 3(*b*) is applied to the coil. This waveform is one in which the pulse length of the pulse in the P2 section shown in FIG. 2 is lengthened. A graph (b) shown by a dotted line shows a waveform of a step motor coil current in the case that the rotor is fixed. The difference between graphs (a) and (b) depends on a counter electromotive voltage generated by the rotation of the rotor, and the waveform of the counter electromotive force may be recognized as the difference between graphs (a) and (b). The counter electromotive voltage e, as is well known, is expressed by $e=k\cdot\omega\cdot\Delta\phi$............ 1. Where k is a proportionality constant, $\omega$ is an angular velocity of the rotor and $\Delta\phi$ is a flux change due to a magnetic field of the direction of a stator axis within a minimum time.

Referring to FIG. 4, the graphs (a) and (b) coincide with each other from a point T1 to a point T. T2 and T3 are points where the counter electromotive voltage e becomes 0 and $\omega$ or $\Delta\phi$ becomes 0 in the above mentioned expression (1).

In short, from T0 to T1 the rotor stands still and the angular velocity $\omega$ is 0.

Next, the rotor begins to reverse towards the axis of the stator and reaches the point T2, generating the counter electromotive voltage. At the point T2, the angular velocity $\omega$ is not 0, but the flux change $\Delta\phi$ of the direction of the axis of the stator is 0. In short, the direction of the magnetic pole of the rotor coincides with the axis of the stator and the magnetic field of the rotor does not generate the flux change within the minimum time. After the point T2, the rotor further rotates in the reverse direction and passes over the axis of the stator for some angle and at a point T3, the angular velocity ω becomes 0. Then, the rotor normally rotates towards the axis of the stator, vibrates while centering at the rest position and then comes to rest within a short time.

From the above explanation, it is understood that the point T2 is an ideal time for reversing a driving pulse from P2 to P3 as shown in FIG. 2. A current level is at the point T2 is obtained by dividing the coil applied voltage by a DC resistance value of the coil. Therefore, when detecting that the coil current reaches this predetermined value, the driving pulse may be reversed.

FIG. 5 shows a block diagram of a reversible actuating or driving circuit.

The driving pulse having a pulse length, a polarity and a frequency controlled by means of a control circuit 6 is fed to a step motor 8 through an driving inverter 7 and drives the step motor 8. When coil current flowing at this time flows through to a resistance 10, the current through the resistance 10 develops a voltage drop across the resistance. The value is compared with a predetermined voltage value, corresponding to the current at time T2, 9 by a voltage detecting circuit 9. When the former is higher than the latter, a signal is fed to the control circuit 6, the driving pulse is inverted and the rotor is reversed.

As afore-mentioned, in accordance with the present invention, a complicated mechanism is not required and a reversible electronic watch may be realized only by modifying a circuit thereof and the effect and advantage thereof is great.

What I claim is:

1. In a step motor and driving circuit for an electronic watch: a rotor having at least two poles, a stator composed of material of high magnetic transmission factor magnetically engaging with the rotor, means composed of a coil magnetically connected to the stator for driving the rotor in response to electrical signals applied thereto, means for positioning the rotor in advance in order to determine a direction of rotation of the rotor, wherein said rotor is normally rotated in a predetermined direction in response to a sequence of alternate polarity driving pulses applied to said coil, and means for applying a narrow pulse narrower than the driving pulses and immediately preceeding a driving pulse to said coil for reversing the direction of rotation of said rotor so that said rotor is driven in the reverse direction by the sequence of alternate polarity driving pulses.

2. In a driving circuit for driving a step motor of the type which is responsive to a sequence of electric driving pulses of alternate polarity for rotating a rotor of the step motor in a predetermined normal direction of rotation determined by a rest position of the rotor; pulse control means for applying in use to the step motor an initial narrow pulse narrower than said driving pulses and effective for rotating the rotor of the step motor in a reverse direction of rotation to initiate rotation of the rotor in the reverse direction and for applying a subsequent driving pulse having a polarity opposite the polarity of the preceding initial narrow pulse for continuing to drive the in the reverse direction after the rotor has rotated beyond a position where the initial narrow pulse becomes ineffective to drive the rotor in the reverse direction.

3. In a driving circuit according to claim 2, wherein said pulse control means is responsive to a control signal for terminating the initial narrow pulse and initiating the drive pulse in response to the control signal, and wherein said pulse control means further comprises rotor position sensing means for sensing when the rotor rotates past the position where the initial narrow pulse becomes ineffective to rotate the rotor in the reverse direction and for applying a control signal to said pulse control means to terminate the initial narrow pulse and initiate the drive pulse when the rotor rotates past the position where the initial narrow pulse becomes ineffective to rotate the rotor in the reverse direction.

4. In a driving circuit according to claim 3, wherein said rotor position sensing means is comprised of a resistor for flowing therethrough a current which flows through the step motor in use in response to the electrical pulses applied to the motor for developing thereacross a voltage drop, and voltage detecting means for detecting the voltage drop across said resistor and for developing the control signal as an output signal when the detected voltage drop across said resistor corresponds to the DC voltage drop of the step motor.

5. A method of operating a step motor of the type which is responsive to a sequence of electric driving pulses of alternate polarity for rotating a rotor of the step motor in a predetermined normal direction of rotation determined by a reset position of the rotor, said method comprising: applying to the step motor an initial narrow pulse narrower than said driving pulses and effective for rotating the rotor of the step motor in a reverse direction of rotation to initiate rotation of the rotor in the reverse direction, and applying a subsequent driving pulse having a polarity opposite the polarity of the preceding initial narrow pulse for continuing to drive the rotor in the reverse direction after the rotor has rotated beyond a position where the initial narrow pulse becomes ineffective to drive the rotor in the reverse direction.

6. A method of operating a step motor according to claim 5, further comprising sensing the position of the rotor to determine when the rotor rotates past the position where the initial narrow pulse becomes ineffective to rotate the rotor in the reverse direction, and terminating the initial narrow pulse and initiating the drive pulse when the rotor rotates past the position where the initial narrow pulse becomes ineffective to rotate the rotor in the reverse direction.

7. A method of operating a step motor according to claim 6, wherein sensing the rotor position comprises sensing the current flowing through the step motor in response to the electrical pulses applied to the motor, and detecting when the current through the motor equals the DC steady state current through the motor.

* * * * *